(12) United States Patent
Zhong

(10) Patent No.: US 11,709,311 B2
(45) Date of Patent: Jul. 25, 2023

(54) ADHESIVE TAPE, BACKLIGHT MODULE, DISPLAY DEVICE AND METHOD FOR MANUFACTURING BACKLIGHT MODULE

(71) Applicants: Chongqing BOE Display Lighting Co., Ltd., Chongqing (CN); BOE TECHNOLOGY GROUP CO., LTD., Beijing (CN)

(72) Inventor: Xihong Zhong, Beijing (CN)

(73) Assignees: Chongqing BOE Display Lighting Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/523,028

(22) Filed: Nov. 10, 2021

(65) Prior Publication Data

US 2022/0299701 A1  Sep. 22, 2022

(30) Foreign Application Priority Data

Mar. 17, 2021 (CN) .......................... 202110285972.X

(51) Int. Cl.
*F21V 8/00* (2006.01)
*C08J 9/14* (2006.01)
(Continued)

(52) U.S. Cl.
CPC ............ *G02B 6/0088* (2013.01); *C08J 9/141* (2013.01); *C09J 5/06* (2013.01); *C09J 5/08* (2013.01);
(Continued)

(58) Field of Classification Search
CPC ..... G02B 6/0088; C08J 9/141; C08J 2203/14; C09J 5/06; C09J 5/08; C09J 2203/318; C09J 2467/006
See application file for complete search history.

(56) References Cited

U.S. PATENT DOCUMENTS 6,175,396 B1 * 1/2001 Kim .................. G02F 1/133308
361/679.21
2004/0141309 A1 * 7/2004 Ida ....................... G02B 6/0088
362/609
(Continued)

FOREIGN PATENT DOCUMENTS

CN       202757022 U    2/2013
CN       103982868 A    8/2014
(Continued)

OTHER PUBLICATIONS

China Patent Office, First Office Action dated Jun. 24, 2022 for application No. CN202110285972.X.
(Continued)

*Primary Examiner* — Mary Ellen Bowman
(74) *Attorney, Agent, or Firm* — Houtteman Law LLC

(57) ABSTRACT

The present disclosure provides an adhesive tape, a backlight module, a display device, and a method for manufacturing a backlight module. The adhesive tape includes: an adhesive body layer; an expandable structure layer on a side of the adhesive body layer and configured to fill a gap between the adhesive tape and a light guide plate of a backlight module through an expansion of the expandable structure layer.

17 Claims, 4 Drawing Sheets

(51) Int. Cl.
*C09J 5/06* (2006.01)
*C09J 5/08* (2006.01)

(52) U.S. Cl.
CPC ...... *C08J 2203/14* (2013.01); *C09J 2203/318* (2013.01); *C09J 2467/006* (2013.01)

(56) References Cited

U.S. PATENT DOCUMENTS

| | | | |
|---|---|---|---|
| 2013/0235611 A1* | 9/2013 | Franklin | G09F 13/04 362/616 |
| 2016/0259122 A1* | 9/2016 | Negoro | G02F 1/133308 |
| 2017/0363904 A1* | 12/2017 | Kinder | G02F 1/133615 |
| 2020/0037445 A1* | 1/2020 | Iwamoto | H05K 3/105 |
| 2022/0342139 A1* | 10/2022 | Hao | G02B 6/0055 |

FOREIGN PATENT DOCUMENTS

| | | | | |
|---|---|---|---|---|
| CN | 205299262 U | | 6/2016 | |
| CN | 107075323 A | * | 8/2017 | ............ B32B 27/00 |
| CN | 107075323 A | | 8/2017 | |
| CN | 110095903 A | | 8/2019 | |
| CN | 110174800 A | | 8/2019 | |
| CN | 110389468 A | | 10/2019 | |
| CN | 110596800 A | | 12/2019 | |
| CN | 110785008 A | | 2/2020 | |
| CN | 106773220 B | | 5/2020 | |
| CN | 111123577 A | | 5/2020 | |
| JP | 2002040413 A | * | 2/2002 | |
| JP | 2002040413 A | | 2/2002 | |
| KR | 20080042223 A | | 5/2008 | |
| WO | 2013063822 A1 | | 5/2013 | |
| WO | 2014019243 A1 | | 2/2014 | |
| WO | 2016078123 A1 | | 5/2016 | |
| WO | 2016173183 A1 | | 11/2016 | |
| WO | 2019059353 A1 | | 3/2019 | |

OTHER PUBLICATIONS

Xinghua Li, "Improvement research of TFT-LCD module black uniformity," Chinese J. Liquid Crystals and Displays, Apr. 15, 2018, 271-76, vol. 33, No. 4.

Rina Tech webpage, "LCD TV Backlight Strip Lens Bonding Glue," www.rinalgp.com, Jan. 17, 2019, cited in China Patent Office First Office Action.

* cited by examiner

ADHESIVE TAPE, BACKLIGHT MODULE, DISPLAY DEVICE AND METHOD FOR MANUFACTURING BACKLIGHT MODULE

CROSS-REFERENCE TO RELATED APPLICATIONS

The present disclosure claims the priority of Chinese Patent Application No. 202110285972.X, filed on Mar. 17, 2021, the contents of which are incorporated herein by reference in its entirety.

TECHNICAL FIELD

The present disclosure relates to the field of display technology, and in particular to an adhesive tape, a backlight module, a display device and a method for manufacturing the backlight module.

BACKGROUND

A Liquid Crystal Display (LCD) generally includes a backlight module and a liquid crystal display panel, and the light-emitting effect of the backlight module directly affects the visual effect of the LCD.

SUMMARY

As an aspect, an adhesive tape is provided. The adhesive tape includes an adhesive body layer; an expandable structure layer on a side of the adhesive body layer and configured to fill a gap between the adhesive tape and a light guide plate of a backlight module through an expansion of the expandable structure layer.

In some embodiments, the expandable structure layer is configured to expand when the expandable structure layer is heated.

In some embodiments, the expansion of the expandable structure layer is irreversible.

In some embodiments, the expandable structure layer includes: a cured adhesive layer having a light-shielding function; and a plurality of thermal expansion microstructures dispersed in the cured adhesive layer.

In some embodiments, each of the thermal expansion microstructures includes: a housing layer forming a sealed space and configured to soften when the housing layer is heated; and a foaming agent in the sealed space and configured to generate a gas when the foaming agent is heated, to expand the housing layer.

In some embodiments, the housing layer includes thermoplastic high-molecular copolymer; and the foaming agent includes alkane.

In some embodiments, the expandable structure layer further includes: first protective layers on two opposite sides of the cured adhesive layer and configured to encapsulate and protect the cured adhesive layer.

In some embodiments, the first protective layers include polyethylene terephthalate.

In some embodiments, the adhesive tape further includes: a heating structure layer configured to heat the expandable structure layer.

In some embodiments, the heating structure layer includes a resistance wire.

In some embodiments, the adhesive tape further includes a second protective layer configured to protect the heating structure layer and including polyethylene terephthalate.

In some embodiments, the heating structure layer is between the expandable structure layer and the adhesive body layer, and the second protective layer is between the heating structure layer and the adhesive body layer.

In some embodiments, the heating structure layer is on a side of the expandable structure layer distal to the adhesive body layer, and the second protective layer is on a side of the heating structure layer distal to the adhesive body layer.

In some embodiments, an orthographic projection of the adhesive body layer on a plane is inside an orthographic projection of the expandable structure layer on the plane, the plane being perpendicular to a thickness direction of the adhesive body layer.

As another aspect, an adhesive tape is provided. The adhesive tape includes: an adhesive body layer; an expandable structure layer on a side of the adhesive body layer and configured to expand when the expandable structure layer is heated so as to fill a gap between the adhesive tape and a light guide plate; and a heating structure layer configured to heat the expandable structure layer. The expandable structure layer includes: a cured adhesive layer having a light-shielding function; a plurality of thermal expansion microstructures dispersed in the cured adhesive layer; and first protective layers on two opposite sides of the cured adhesive layer. Each of the thermal expansion microstructures includes a housing layer forming a sealed space and configured to soften when the housing layer is heated; and a foaming agent in the sealed space and configured to generate a gas when the foaming agent is heated, so as to expand the housing layer. An orthographic projection of the adhesive body layer on a plane is inside an orthographic projection of the expandable structure layer on the plane, the plane being perpendicular to a thickness direction of the adhesive body layer.

As yet another aspect, a backlight module includes a back plate including a bottom plate, a side wall and a top plate, and the bottom plate, the side wall and the top plate enclose a cavity; a light source in the cavity; a light guide plate on the bottom plate of the back plate, wherein one end of the light guide plate serving as a light entry surface is in the cavity, and an interval space between a portion of the light guide plate in the cavity and the top plate; and the adhesive tape described above, wherein the adhesive tape is in the interval space and adhered to the top plate of the back plate. The expanded expandable structure layer of the adhesive tape fills a gap between the adhesive tape and the light guide plate.

As another aspect, a display device includes a backlight module described above and a display panel. Light emitted from the light guide plate of the backlight module enters the display panel.

A method for manufacturing a backlight module includes: fixing a light source and a light guide plate inside a back plate, wherein the back plate comprises a bottom plate, a side wall and a top plate, the bottom plate, the side wall and the top plate enclose a cavity, the light source is in the cavity, the light guide plate is on the bottom plate, one end of the light guide plate serving as a light entry surface is in the cavity, and an interval space is formed between a portion of the light guide plate in the cavity and the top plate; placing the adhesive tape described above in the interval space and adhering the adhesive tape to the top plate, with a gap being between the adhesive tape and the light guide plate; and expanding the expandable structure layer of the adhesive tape to fill the gap.

In some embodiments, expanding the expandable structure layer of the adhesive tape includes heating the expandable structure layer.

DETAILED DESCRIPTION

In order to enable one of ordinary skill in the art to better understand the technical solution of the present disclosure, an adhesive tape, a backlight module, a display device, and a method for manufacturing a backlight module will be described in detail below in combination with the accompanying drawings.

Figure 1:
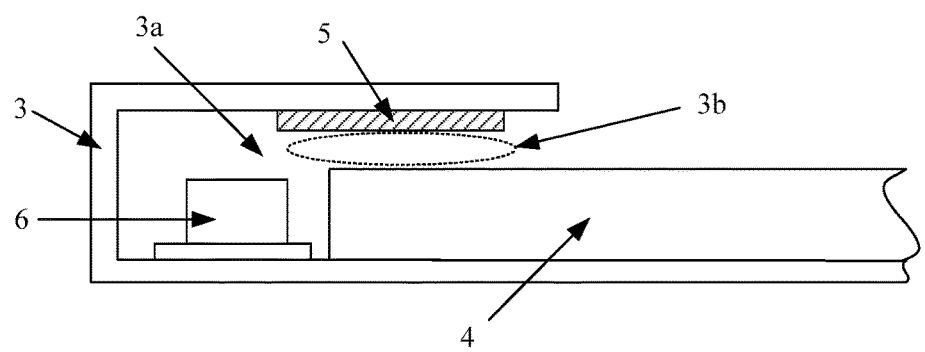
FIG. 1 is a schematic cross-sectional view showing a backlight module according to the related art.

FIG. 1 is a schematic cross-sectional view showing a backlight module according to the related art. As shown in FIG. 1, the backlight module includes: a back plate 3, a light source 6 and a light guide plate 4. An edge of the back plate is bent to form a cavity 3a. The light source 6 and one end of the light guide plate 4 serving as a light inlet surface are located in the cavity 3a. In order to facilitate the assembly of the light guide plate 4, a height of the cavity 3a is greater than a thickness of the light guide plate 4, so that after the assembly of the light guide plate 4 is completed, an interval space exists between a portion of the light guide plate 4 located in the cavity 3a and the top plate of the cavity 3a. Light emitted from the light source may be emitted out through the interval space, so that the phenomenon of light leakage occurs.

In the related art, in order to solve the above-mentioned technical problem, generally, after the assembly of the light guide plate 4 is completed, an adhesive tape 5 (i.e., a light-shielding tape 5) is disposed in the interval space to shield the light emitted out from the interval space. Generally, the adhesive tape 5 is placed on a support plate, the support plate on which the adhesive tape 5 is placed is then placed into the interval space, and then the adhesive tape 5 is adhered to the top plate, and at last, the support plate is taken out, so that the adhesion of the adhesive tape 5 is finished. In the related art, although the adhesive tape 5 can reduce light leakage to a certain extent, there is necessarily a gap between the adhesive tape 5 and the light guide plate 4 after the support plate is taken out, and light emitted from the light source 6 may be emitted out through the gap, therefore the light leakage still occurs.

The present disclosure provides an adhesive tape, a backlight module, a display device and a method for manufacturing the backlight module.

Figure 2:
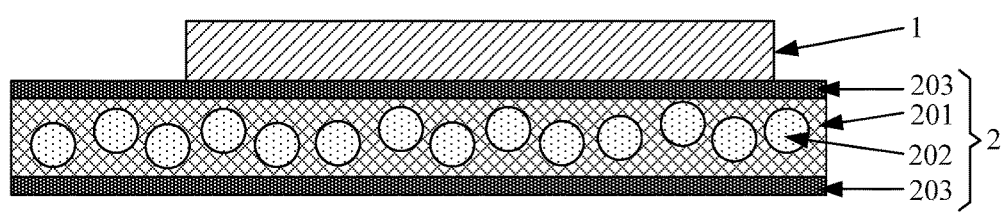
FIG. 2 is a schematic cross-sectional view showing an adhesive tape according to an embodiment of the present disclosure.

FIG. 2 is a schematic cross-sectional view showing an adhesive tape according to an embodiment of the present disclosure. As shown in FIG. 2, the adhesive tape includes: an adhesive body layer 1 and an expandable structure layer 2.

The adhesive body layer 1 may be made of double-sided adhesive tape commonly used in the liquid crystal display industry, and a thickness of the adhesive body layer may be selected as needed. The expandable structure layer 2 is fixed on a side of the adhesive body layer 1, and the expandable structure layer 2 is configured to expand and deform after being subjected to predetermined stimulation/predetermined stimulus.

In the embodiment of the present disclosure, during the process for manufacturing the backlight module, the light guide plate 4 and the light source 6 are fixed on the back plate 3, so that an interval space is formed between a portion of the light guide plate 4 located in the cavity 3a and the top plate 303; the adhesive tape in the embodiment of the present disclosure is placed into the interval space by using the support plate; the adhesive tape is adhered to the top plate 303, since a surface of the adhesive body layer 1 distal to the expandable structure layer 2 has adhesion thereon; the support plate is removed from the interval space, so that a gap is formed between the adhesive tape and the light guide plate; and finally, and a predetermined stimulation is applied to the expandable structure layer 2 of the adhesive tape, to deform the expandable structure layer 2 to fill the gap, thereby effectively avoiding the light leakage.

The present disclosure provides an adhesive tape applied to a backlight module. The adhesive tape can fill the interval space between the light guide plate and the top plate, thereby preventing light emitted from the interval space between light guide plate and the top plate from directly entering into the display panel, thereby effectively solving the problem of the light leakage in the backlight module.

In some embodiments, the expandable structure layer 2 is configured to deform through expansion when the expandable structure layer 2 is heated. That is, by heating the expandable structure layer 2 to raise the temperature of the expandable structure layer 2, the expandable structure layer 2 may expand and then deform.

It should be noted that, the expandable structure layer 2 adopting a thermal expansion structure is only an optional embodiment in the present disclosure, which does not limit the technical solution of the present disclosure. In the embodiment of the present disclosure, the expandable structure layer 2 may be made of any material with expandable property or may have a structure with expandable property. "Predetermined stimulus" may be selected according to the material or structure of the expandable structure layer 2, and "predetermined stimulus/predetermined stimulus" includes, but is not limited to, temperature, chemical agent, mechanical force, light, electric field, or magnetic field, etc. In an embodiment, the expandable structure layer 2 is made of an electrically deformable material, and the expansion and deformation of the electrically deformable material is controlled by controlling an electric field in a space where the electrically deformable material is located. Other examples of the expandable structure layer 2 are not illustrated here one by one.

In some embodiments, the expansion and deformation of the expandable structure layer 2 is irreversible. That is, the expandable structure layer 2 can maintain in the expanded and deformed state after the predetermined stimulus is removed.

In some embodiments, the expandable structure layer 2 includes a cured adhesive layer 201 and a plurality of thermal expansion microstructures 202 (each of which has a spherical shape). The cured adhesive layer 201 is made of a material having a light-shielding function, and the thermal expansion microstructures 202 are dispersed in the cured adhesive layer 201. The thermal expansion microstructures 202 may expand and deform when the thermal expansion microstructures 202 are heated (e.g., the thermal expansion microstructures 202 may thermally expand at a temperature range from 80° C. to 120° C.), so that the cured adhesive layer 201 also expands and deforms.

In some embodiments, the expandable structure layer 2 further includes first protective layers 203 on two opposite sides of the cured adhesive layer 201, and the first protective layers 203 are configured to package and protect the cured adhesive layer 201. The first protective layers 203 may be made of thermoplastic material, such as Polyethylene Terephthalate (PET). When the cured adhesive layer 201 (i.e., the thermal expansion microstructures 202) is heated so that the entire of the cured adhesive layer 201 thermally expands and deforms, the first protective layer 203 may be softened, and moved and deformed due to the expansion and the deformation of the cured adhesive layer 201; when the heating is finished and the temperature returns to a normal level, the first protective layers 203 are hardened again.

Figure 3:
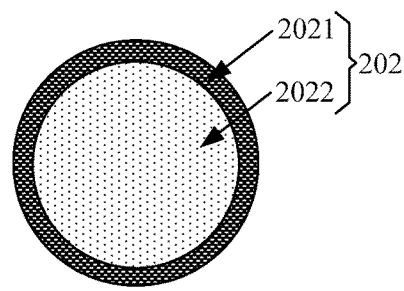
FIG. 3 is a schematic diagram showing a structure of a thermal expansion microstructure according to an embodiment of the present disclosure.

FIG. 3 is a schematic diagram showing a structure of a thermal expansion microstructure according to an embodiment of the present disclosure. As shown in FIG. 3, the thermal expansion microstructure 202 includes a housing layer 2021 and a foaming agent 2022. The housing layer 2021 forms a sealed space, the housing layer 2021 is configured to soften when the housing layer 2021 is heated. The foaming agent 2022 is located in the sealed space. When the cured adhesive layer 201 is heated, the housing layer 2021 is heated and thus, softens; and the foaming agent 2022 generates a high-pressure gas when the foaming agent 2022 is heated, so that the housing layer 2021 expands.

In some embodiments, the housing layer 2021 includes a thermoplastic high-molecular copolymer; and the foaming agent 2022 includes alkanes, such as cyclopentane.

In the embodiment of the present disclosure, the expandable structure layer 2 may be heated in various ways, such as provided with a structure with a heating function integrated into the adhesive tape, or alternatively directly provided with an external heating structure (e.g., a high temperature process cavity) for heating the expandable structure layer 2. The structure with a heating function is integrated into the adhesive tape, which can accurately control a heated region, thereby avoiding an adverse effect caused by the high temperature on the structures at other positions on the backlight module. The expandable structure layer 2 may be heated directly by an external heating structure, which can simplify the structure of the adhesive tape.

The adhesive tape shown in FIG. 2 may be manufactured according to the following method. Firstly, an expandable structure layer 2 is prepared, and then an adhesive body layer 1 is formed on the expandable structure layer 2. An embodiment in which the expandable structure layer 2 includes two first protective layers 203, a cured adhesive layer 201, and a plurality of thermal expansion microstructures 202 is illustrated as an example. The process for preparing the expandable structure layer 2 is as follows. Firstly, a first protective layer 203 is formed on a base substrate; and then a plurality of expansion microstructures (i.e., expansion microspheres) and the liquid adhesive are mixed uniformly, the mixture of the expansion microstructures and the liquid adhesive are coated on the first protective layer 203, and a curing treatment is performed on the mixture to obtain a cured adhesive layer 201 (containing the thermal expansion microstructures 202); finally, another first protective layer 203 is formed on the cured adhesive layer 201.

Figure 4:
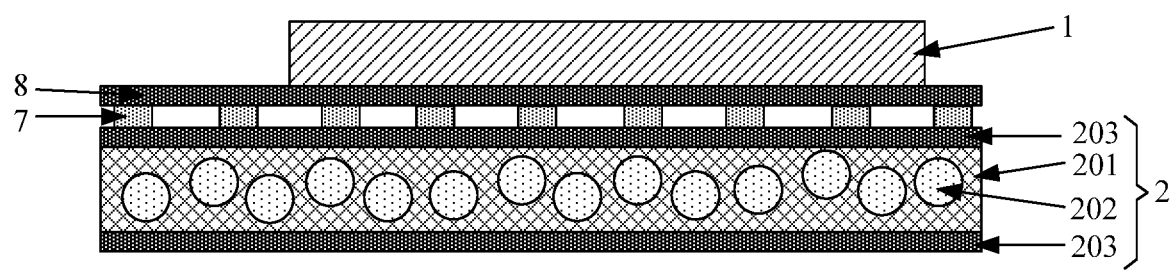
FIG. 4 is a schematic diagram showing another structure of an adhesive tape according to an embodiment of the present disclosure.

FIG. 4 is a schematic diagram showing a structure of another adhesive tape according to an embodiment of the present disclosure. As shown in FIG. 4, in some embodiments, the adhesive tape further includes a heating structure layer 7 configured to heat the expandable structure layer 2. The heating structure layer 7 is located between the expandable structure layer 2 and the adhesive body layer 1. Further, the heating structure layer 7 includes a resistance wire, such as a copper wire. The electric power is supplied to the resistance wire, so that the heat energy is generated, when the current flows through the conductor, according to the Joule Effect.

In some embodiments, a second protective layer 8 is disposed between the heating structure layer 7 and the adhesive body layer 1, and the second protective layer 8 may protect the heating structure layer 7. The second protective layer 8 may include a thermoplastic material, such as PET.

The adhesive tape shown in FIG. 4 may be prepared according to the following method. Firstly, an expandable structure layer 2 is prepared, a heating structure layer 7 is formed on the expandable structure layer 2, a second protective layer 8 is formed on the heating structure layer 7, and finally an adhesive body layer 1 is formed on the second protective layer 8.

Figure 5:
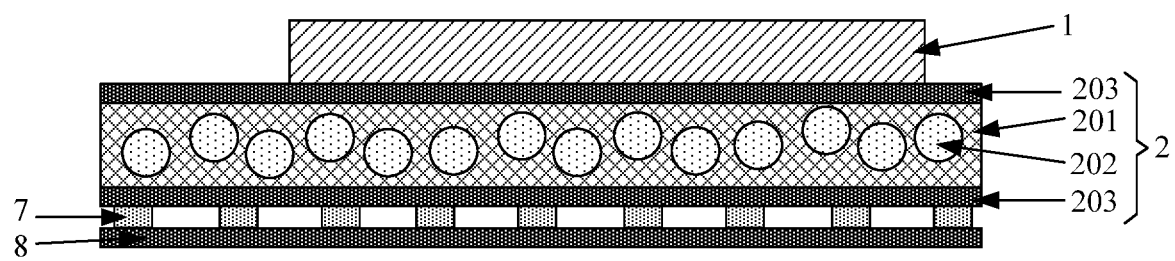
FIG. 5 is a schematic diagram showing another structure of an adhesive tape according to an embodiment of the present disclosure.

FIG. 5 is a schematic diagram showing a structure of another adhesive tape according to an embodiment of the present disclosure. The adhesive tape shown in FIG. 5 is different from the adhesive tape in FIG. 4 in that the heating structure layer 7 is located on a side of the expandable structure layer 2 distal to the adhesive body layer 1, and a second protective layer 8 is disposed on a side of the heating structure layer 7 distal to the adhesive body layer 1.

The adhesive tape shown in FIG. 5 may be prepared according to the following method. Firstly, a second protective layer 8 is prepared, a heating structure layer 7 is formed on the second protective layer 8, an expandable structure layer 2 is formed on the heating structure layer 7, and finally an adhesive body layer 1 is formed on the expandable structure layer 2.

In the embodiment of the present disclosure, an orthographic projection of the adhesive body layer 1 on a preset plane is inside an orthographic projection of the expandable structure layer 2 on the preset plane, and the preset plane is perpendicular to a thickness direction of the adhesive body layer 1. That is, a size of the expandable structure layer 2 is greater than or equal to a size of the adhesive body layer 1, so as to ensure that the expandable structure layer 2 can effectively fill a space between the adhesive body layer 1 and the light guide plate.

Figure 6:
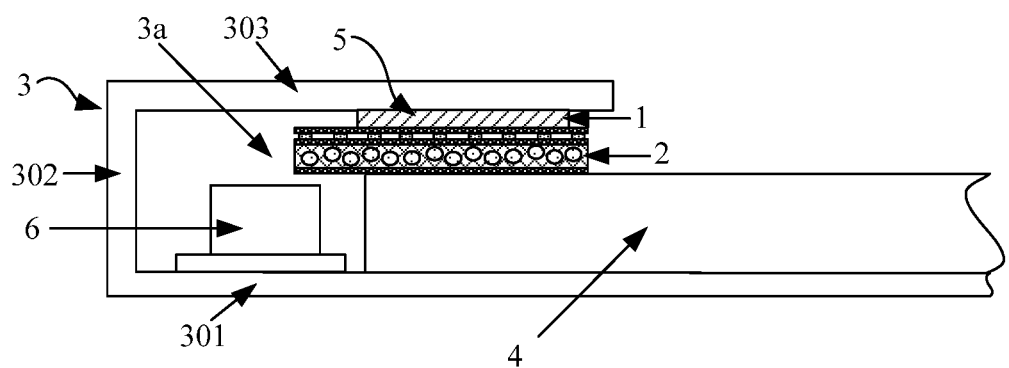
FIG. 6 is a schematic cross-sectional view showing a backlight module according to an embodiment of the present disclosure.

Based on the same inventive concept, an embodiment of the present disclosure also provides a backlight module. FIG. 6 is a schematic cross-sectional view showing a backlight module according to an embodiment of the present disclosure. As shown in FIG. 6, the backlight module includes a back plate 3, a light source 6, a light guide plate 4 and an adhesive tape 5.

The back plate 3 includes a bottom plate 301, a side wall 302 and a top plate 303. The bottom plate 301, the side wall 302 and the top plate 303 enclose a cavity 3a. The back plate 3 may include a metal material such as aluminum. The back plate 3 may be one-piece structure, for example, a stamping process is performed on the metal material to form the back plate 3. The light source 6 is located in the cavity 3a, and the light source 6 may be an LED light bar. The light guide plate 4 is located on the bottom plate 301. One end of the light guide plate 4 (i.e., a light source with light entering in a side-in manner) serving as a light incident surface/light inlet surface is located in the cavity 3a, and an interval space is formed between a portion of the light guide plate 4 located in the cavity 3a and the top plate 303. The adhesive tape 5 is the adhesive tape 5 according to any one of the previous embodiments. The adhesive tape 5 is located in the interval space, and a surface of the adhesive body layer 1 distal to the expandable structure layer 2 is adhered to the top plate 303.

Figure 7:
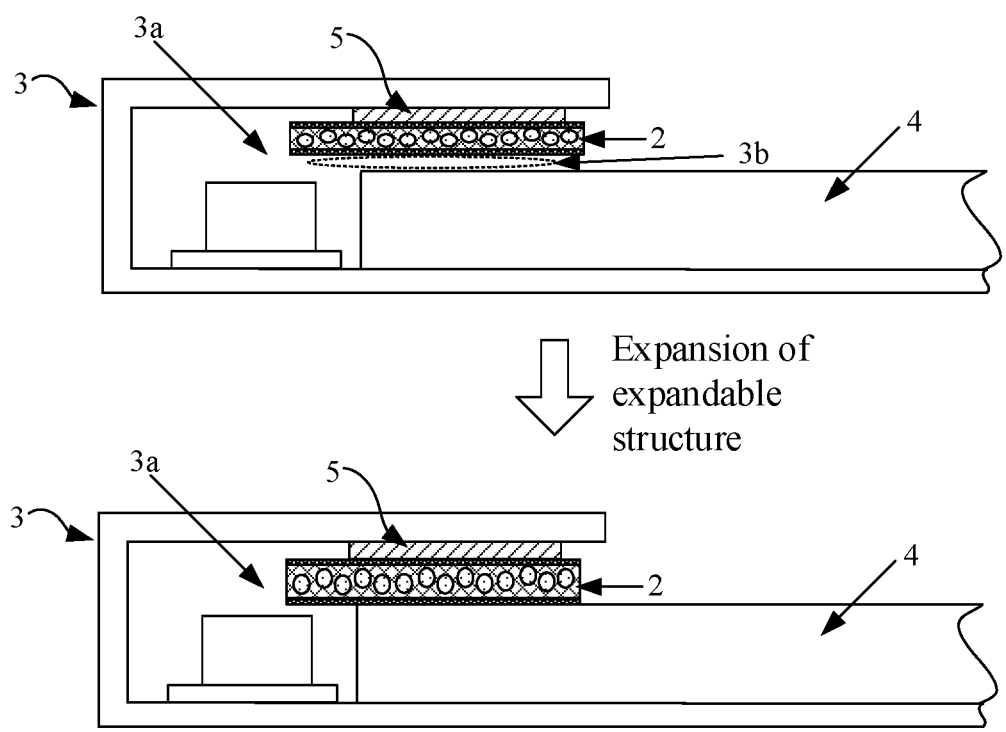
FIG. 7 is a schematic cross-sectional view showing that an expandable structure layer expands and deforms to fill a gap according to an embodiment of the present disclosure.

FIG. 7 is a schematic cross-sectional view showing that an expandable structure layer expands and deforms to fill a gap according to an embodiment of the present disclosure. As shown in FIG. 7, after the adhesive tape 5 is adhered to the top plate by using the support plate and the support plate is removed from the interval space, a gap 3b exists between the adhesive tape 5 that is not expanded and the light guide plate 4. The expandable structure layer 2 fills the gap 3b after the expandable structure layer 2 is applied with a predetermined stimulus.

Based on the same inventive concept, an embodiment of the present disclosure further provides a display device. The display device includes a display panel and a backlight module. Light emitted from a light guide plate of the backlight module enters the display panel. The backlight module adopts the backlight module provided in any one of previous embodiments. For the specific description of the backlight module, reference may be made to the corresponding contents in the foregoing embodiments, which will not be described herein again.

The display device in the embodiments of the present disclosure may be any product or component with a display function, such as a liquid crystal display, electronic paper, a mobile phone, a tablet personal computer, a television, a notebook computer, a digital photo frame, a navigator and the like.

Figure 8:
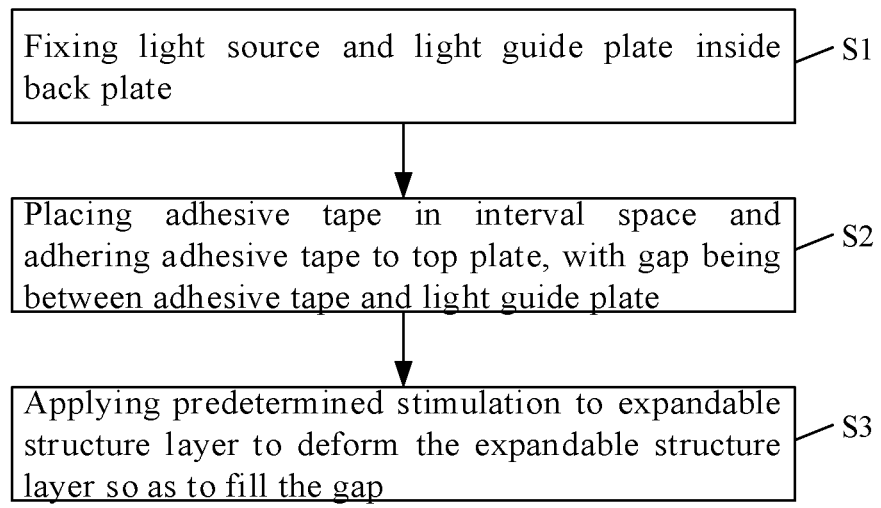
FIG. 8 is a flowchart showing a method for manufacturing a backlight module according to an embodiment of the present disclosure.

Based on the same inventive concept, an embodiment of the present disclosure also provides a method for manufacturing the backlight module. FIG. 8 is a flowchart showing a method for manufacturing a backlight module according to an embodiment of the present disclosure. As shown in FIG. 8, the method for manufacturing a backlight module according to the previous embodiment includes steps S1 to S3.

At step S1, the light source and the light guide plate are fixed onto the back plate.

The back plate includes a bottom plate, a side wall and a top plate. The bottom plate, the side wall and the top plate enclose a cavity. A light source is located in the cavity, the light guide plate is located on the bottom plate. One end of the light guide plate serving as the light inlet surface is located in the cavity, and an interval space is formed between a portion of the light guide plate in the cavity and the top plate.

At step S2, an adhesive tape is placed in the interval space and adhered onto the top plate. A gap exists between the adhesive tape and the light guide plate.

The adhesive tape is the adhesive tape according to any one of the previous embodiments.

At step S3, a predetermined stimulus is applied to the expandable structure layer of the adhesive tape to deform the expandable structure layer, so that the expandable structure layer fills the gap.

In some embodiments, the expandable structure layer is configured to expand and deform when the expandable structure layer is heated, and a heating structure layer is disposed between the expandable structure layer and the adhesive body layer of the adhesive tape, or alternatively disposed on a side of the expandable structure layer distal to the adhesive body layer. Step S3 may specifically include: heating the expandable structure layer by using the heating structure layer.

For the descriptions of the above steps S1 to S3, reference may be made to the contents of the foregoing embodiments, and details will not be repeated here.

It should be understood that the above implementations are merely exemplary embodiments for the purpose of illustrating the principles of the present disclosure, however, the present disclosure is not limited thereto. It will be apparent to one of ordinary skill in the art that various changes and modifications can be made without departing from the spirit and essence of the present disclosure, and such changes and modifications also fall within the scope of the present disclosure.

What is claimed is:

1. An adhesive tape, comprising:
   an adhesive body layer;
   an expandable structure layer on a side of the adhesive body layer and configured to fill a gap between the adhesive tape and a light guide plate of a backlight module through an expansion of the expandable structure layer, the expandable structure layer is configured to expand when the expandable structure layer is heated,
   a heating structure layer configured to heat the expandable structure layer.

2. The adhesive tape of claim 1, wherein
   the expansion of the expandable structure layer is irreversible.

3. The adhesive tape of claim 1, wherein the expandable structure layer comprises:
   a cured adhesive layer having a light-shielding function; and
   a plurality of thermal expansion microstructures dispersed in the cured adhesive layer.

4. The adhesive tape of claim 3, wherein each of the thermal expansion microstructures comprises:
   a housing layer forming a sealed space and configured to soften when the housing layer is heated; and
   a foaming agent in the sealed space and configured to generate a gas when the foaming agent is heated, to expand the housing layer.

5. The adhesive tape of claim 4, wherein
   the housing layer comprises thermoplastic high-molecular copolymer; and
   the foaming agent comprises alkane.

6. The adhesive tape of claim 3 wherein the expandable structure layer further comprises:
   first protective layers on two opposite sides of the cured adhesive layer and configured to encapsulate and protect the cured adhesive layer.

7. The adhesive tape of claim 6, wherein
   the first protective layers comprise polyethylene terephthalate.

8. The adhesive tape of claim 1, wherein
   the heating structure layer comprises a resistance wire.

9. The adhesive tape of claim 1, further comprising a second protective layer configured to protect the heating structure layer and comprising polyethylene terephthalate.

10. The adhesive tape of claim 9, wherein
the heating structure layer is between the expandable structure layer and the adhesive body layer, and
the second protective layer is between the heating structure layer and the adhesive body layer.

11. The adhesive tape of claim 9, wherein
the heating structure layer is on a side of the expandable structure layer distal to the adhesive body layer, and
the second protective layer is on a side of the heating structure layer distal to the adhesive body layer.

12. The adhesive tape of claim 1, wherein
an orthographic projection of the adhesive body layer on a plane is inside an orthographic projection of the expandable structure layer on the plane, the plane being perpendicular to a thickness direction of the adhesive body layer.

13. An adhesive tape, comprising:
an adhesive body layer;
an expandable structure layer on a side of the adhesive body layer and configured to expand when the expandable structure layer is heated, so as to fill a gap between the adhesive tape and a light guide plate of a backlight module; and
a heating structure layer configured to heat the expandable structure layer,
wherein the expandable structure layer comprises:
a cured adhesive layer having a light-shielding function;
a plurality of thermal expansion microstructures dispersed in the cured adhesive layer; and
first protective layers on two opposite sides of the cured adhesive layer,
wherein each of the plurality of thermal expansion microstructures comprises:
a housing layer forming a sealed space and configured to soften when the housing layer is heated; and
a foaming agent in the sealed space and configured to generate a gas when the foaming agent is heated, so as to expand the housing layer, and
wherein an orthographic projection of the adhesive body layer on a plane is inside an orthographic projection of the expandable structure layer on the plane, the plane being perpendicular to a thickness direction of the adhesive body layer.

14. A backlight module comprises:
a back plate comprising a bottom plate, a side wall and a top plate, and the bottom plate, the side wall and the top plate enclose a cavity;
a light source in the cavity;
the light guide plate on the bottom plate of the back plate, wherein one end of the light guide plate serving as a light entry surface is in the cavity, such that an interval space is between a portion of the light guide plate in the cavity and the top plate; and
the adhesive tape of claim 1, wherein the adhesive tape is in the interval space and adhered to the top plate of the back plate,
wherein the expanded expandable structure layer of the adhesive tape fills a gap between the adhesive tape and the light guide plate.

15. A display device, comprising:
a backlight module of claim 14; and
a display panel, wherein light emitted from the light guide plate of the backlight module enters the display panel.

16. A method for manufacturing a backlight module comprising:
fixing a light source and a light guide plate inside a back plate, wherein the back plate comprises a bottom plate, a side wall and a top plate, the bottom plate, the side wall and the top plate enclose a cavity, the light source is in the cavity, the light guide plate is on the bottom plate, one end of the light guide plate serving as a light entry surface is in the cavity, and an interval space is formed between a portion of the light guide plate in the cavity and the top plate;
placing the adhesive tape of claim 1 in the interval space and adhering the adhesive tape to the top plate, with a gap being between the adhesive tape and the light guide plate; and
expanding the expandable structure layer of the adhesive tape to fill the gap.

17. The method of claim 16, wherein expanding the expandable structure layer of the adhesive tape, comprises:
heating the expandable structure layer.

* * * * *